June 26, 1923.
G. ERNST
SAFETY GAUGE GLASS
Filed Dec. 7, 1920
1,459,952
2 Sheets-Sheet 2
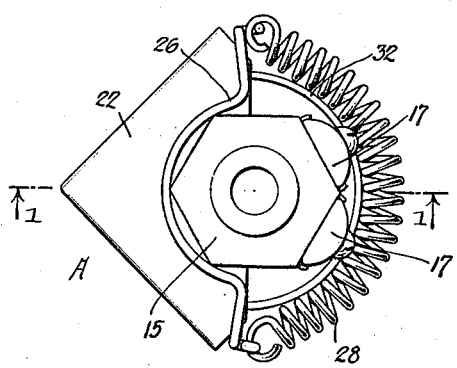
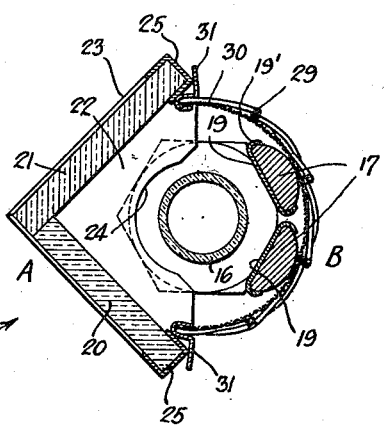
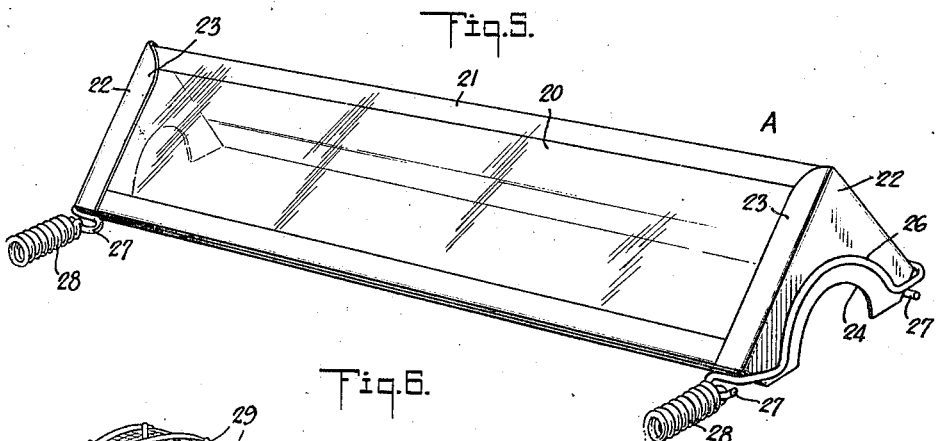
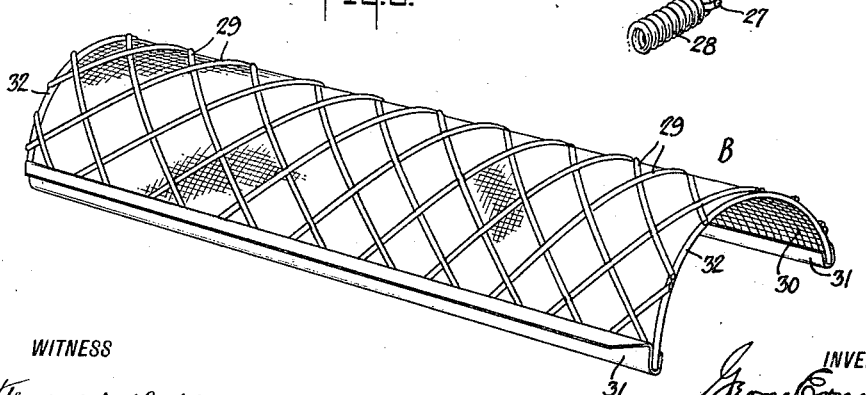
WITNESS
Frederick Diehl.
INVENTOR
George Ernst
BY
Geo. L. Beeler
ATTORNEYS Patented June 26, 1923.

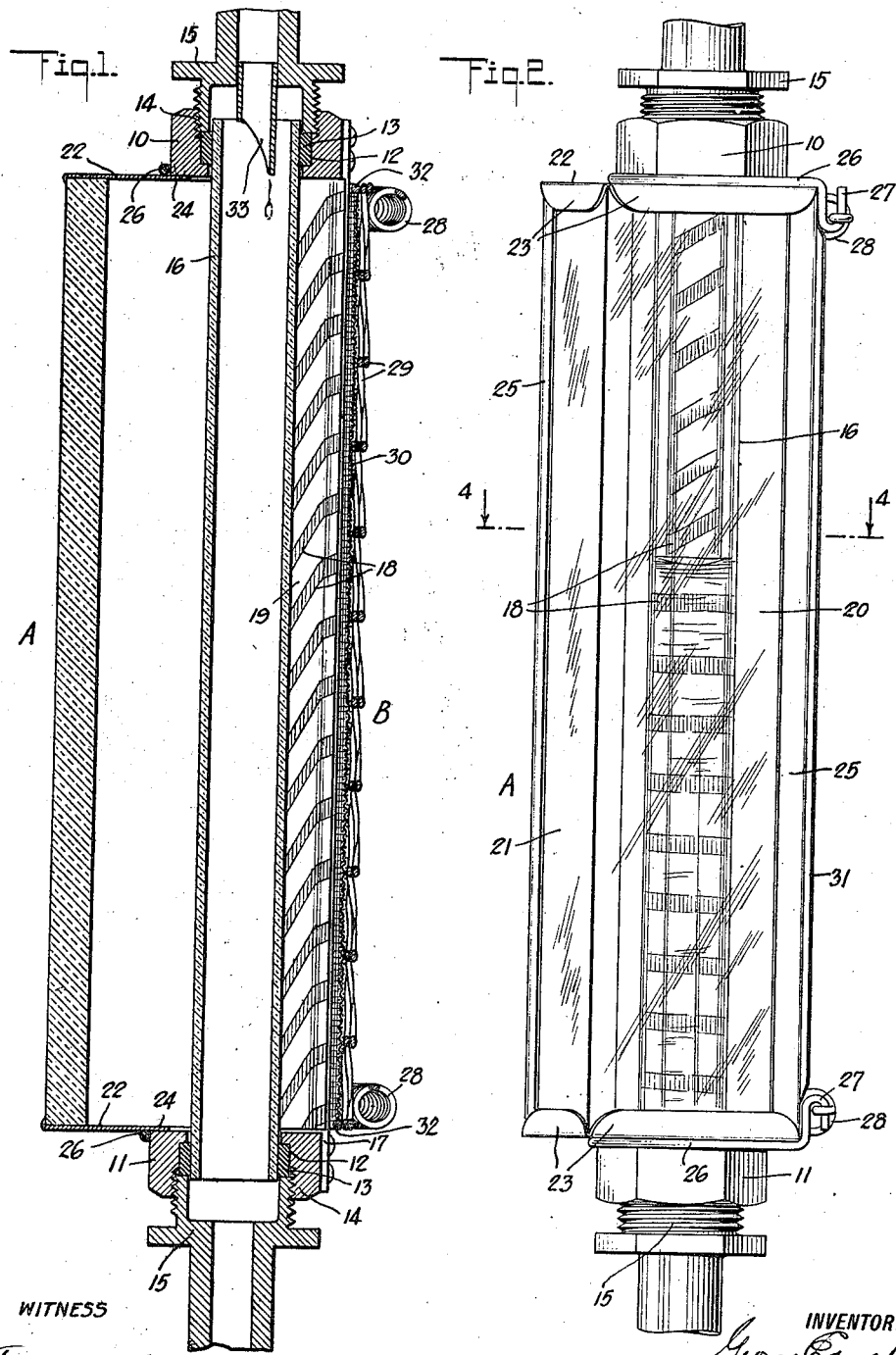

1,459,952

UNITED STATES PATENT OFFICE.

GEORGE ERNST, OF NEWARK, NEW JERSEY.

SAFETY GAUGE GLASS.

Application filed December 7, 1920. Serial No. 428,964.

*To all whom it may concern:*

Be it known that I, GEORGE ERNST, a citizen of the United States, residing at Newark, in the county of Essex and State of New Jersey, have invented certain new and useful Improvements in Safety Gauge Glasses, of which the following is a specification.

This invention relates to gauge glasses for steam boilers or other analogous purposes, and it has special reference to visible gauge glasses having a protecting means therefor.

Among the objects of the invention is to provide a guard for the sight glass, comprising a plurality of heavy or reinforced transparent panels for the front of the glass and arranged at right angles to one another.

Another object of the invention is to provide a guard for the back portion of the glass and comprising a plurality of open mesh members composed preferably of large and small mesh wire fabrics respectively, special means being provided to secure these members together and the guard as a whole to the other parts of the structure.

A further object of the invention is to provide a gauge glass comprising upper and lower heads held in spaced relation to each other by means of one or more rigid members serving as indicators of peculiar and novel construction.

A still further object of the invention is to provide a gauge glass having the guard means located within or between said heads and providing for the adjustment of the guard around the vertical or longitudinal axis of the sight glass.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical section on the line 1—1 of Fig. 3.

Fig. 2 is a side elevation as viewed in the direction of the arrow 2, Fig. 4.

Fig. 3 is a plan view.

Fig. 4 is a horizontal section on the line 4—4 of Fig. 2.

Fig. 5 is a detail perspective view of the front guard.

Fig. 6 is a similar detail view of the rear guard.

Referring now more specifically to the drawings my improved glass comprises what I term upper and lower heads 10 and 11, indicated in the form of hexagonal nuts, each of which is provided with a seat 12 for a packing gasket 13 and with a threaded portion 14 for the accommodation of a coupling nipple 15 rotatable within the head for compressing the gasket and gripping the same upon the outer surface of the tubular sight glass 16. The heads will ordinarily be regarded as being stationary, and the nipples 15 may be rotated therein for tightening or loosening the packing members. The form of the heads and nipples adapts them for the application of two wrenches, one to hold the head steady while the other rotates the nipple.

Any suitable means may be provided to hold the heads in definite spaced relation to each other and relatively fixed. To this end I indicate one or more rigid members 17, shown as of solid metal of a semi-oval form in cross section, the inner or flat faces of which are secured directly against any selected flat faces of the heads. These bars 17, if enough of them were used, serve as guard members for the sight glass 16. Sufficient space is left between these bars to afford a view of the sight glass in case as many bars are used as the heads have faces. Another purpose of the bars 17 is to constitute indicators or indicator supports, the inner face of each bar serving to carry any suitable design of indicator marks, such as a vertical stripe of a distinctive color, such as red or any other arrangement of distinctive color markings shown herein as a vertical series of inclined or spirally arranged stripes 18. These markings may be applied to the bars in any convenient manner, but I have found in my practice that the markings are preferably formed on or carried by a sheath 19 of thin sheet material, such as tin having marginal flanges 19′ snapping over the edges of a bar so as to be self supporting upon the bar. These sheaths are therefore readily removable or interchangeable so that any desired design of markings may be used on any bar, or the various bars of a single gauge structure may carry different designs of markings if so desired. Any bar and its markings may be regarded as an indicator. As noted in Fig. 2 the water in the sight glass causes a transformation in appearance of the indicator markings of a very peculiar and characteristic nature. The markings which without the water appear to be inclined or spiral are caused by the water to appear substantially horizontal and longer in extent, thereby producing a marked contrast between the upper and lower portions of the indicator.

As above premised the guard means illustrated comprises a front guard A and a rear guard B extending all the way between the two heads 10 and 11 but not overlapping the heads. The guard means are made of a length corresponding to the space between the heads which is predetermined in accordance with the length of the indicator bars.

The front guard A comprises, in the form shown, two plates of glass 20 and 21 arranged at a right angle to each other, the joint between the two plates being parallel to one of them, and hence is so disposed that in the event of breakage of the sight glass 16 no particles of glass or even steam could reach an operator anywhere in front of the gauge. These plates 20 and 21 may be secured in angular relation by any suitable means including a metallic frame comprising upper and lower caps 22 each of generally triangular form and having flanges 23 overlapping the ends of the plates. The main portion of each cap extends horizontally toward but spaced slightly from the sight glass 16 as shown at 24. This web or main portion of the cap lies against the inner face of the adjacent head, or the place directed toward the opposite head. Extending along the otherwise free edges of the plates 20 and 21 and vertically between the remote corners of the caps are channel members 25 embracing the edges of the plates. These channel members are fixed rigidly to the corners of the caps constituting therewith a strong metallic frame for the front guard. Secured in any suitable manner, as by soldering, to each of the caps is a hanger member 26, the main portion of which is in the form of an arc of a circle and adapted to bear against the adjacent head to limit the movement of the front guard toward the sight glass, and the ends of each hanger are formed into hooks 27 for the attachment of a fastener preferably in the form of a coil spring 28. The spring is attached permanently to one of the hooks and is detachably connected to the other hook so that the guard as a whole may easily be removed by unhooking the ends of the spring. The springs pass flexibly around the indicator bars and also around the rear guard as shown, and so they hold the front guard resiliently in place and provide for the rotation or adjustment thereof around the vertical axis of the gauge to any desired location according to the position of the operator.

The rear guard B may be of any suitable material, but shown as comprising two mesh members 29 and 30, the former being stronger and having larger meshes than the other one. The lighter member 30 is preferably located within the other for maximum strength. The edge portions of the rear guard are reinforced or bound by metal angle members 31 each having a flange projecting substantially radially outward therefrom to bear against the adjacent channel member 25 to limit the inward movement of the rear guard while the edge portion thereof passes between said channel and the sight glass. The upper and lower ends of the rear guard comprise pieces of heavy wire 32. Endwise movement of the rear guard up or down is prevented both by the grip of the springs 28 and by contact with the horizontal portions of the caps 22. In other words, the rear guard is located between the caps 22.

The guard members are so constructed that they transmit practically all of the light to and through the sight glass, and yet from the nature of the guard members the breakage or explosion of said glass cannot result in injury to the operator or any other person around the machine. Most cases of leakage of a gauge glass occur at the joints between the ends of the sight glass and the nipples, and hence to correct such leakage it is necessary to have access to the heads or nuts and the nipples. The location of my guard members is such that they need not be removed for this purpose. However, should it be desired to remove the guard members for interchange or any other purpose the same can be readily accomplished simply by disconnecting the springs from the hooks 27 at one side of the gauge. After the springs are so disconnected both guard members are directly removable. It will be noted also that there is nothing to prevent the adjustment of the guard members around the axis of the gauge so as to bring the indicator bars into the most suitable location with respect to the position of the operator.

The device shown at 33 in Fig. 1 is a centralizer, serving to cause the condensation water to drop without flowing down the sight glass.

I claim:

1. The herein described indicator bar for gauge glasses, the same comprising a straight bar having a flat surface with parallel edges, and a sheet material member fitted over said flat surface and having edge flanges embracing the edges of the bar, said member having color markings on its inner surface.

2. The herein described indicator bar for gauge glasses, comprising a straight metal bar and a sheath of sheet material shaped to detachably snap over the inner surface of the bar between the bar and the gauge glass and spaced from the latter, said sheath constituting a color carrier.

3. A gauge glass comprising a sight glass, upper and lower stationary heads into which the ends of the sight glass are projected, rigid means secured to both heads serving to hold them in predetermined spaced relation to each other, a pair of nipples having threaded co-operation with the heads and through the rotation of which nipples the ends of the sight glass are directly sealed in the heads, a front guard member comprising upper and lower caps located entirely within the space between the heads and transparent means extending between the caps, and means to hold the guard member in place.

4. The herein described gauge glass comprising a sight glass, a front guard comprising a transparent imperforate member and engagement means at its ends having hooks, a rear guard extending around the sight glass from one side of the front guard to the other, and resilient members extending from one side of the front guard member around the other guard member for detachable engagement with said hooks.

5. The herein described gauge glass comprising a front guard member, a rear guard member, the side edges of one guard member embracing the corresponding edges of the other guard member, and fastening means to hold both guard members in place, said fastening means consisting of a pair of coil springs permanently connected at one end to one side of the front guard member and having detachable connection at the other end with the other side of the front guard member.

GEORGE ERNST.